April 14, 1925.  R. O'FLAHERTY  1,533,450
VEHICLE WHEEL
Filed Dec. 13. 1923   2 Sheets-Sheet 2
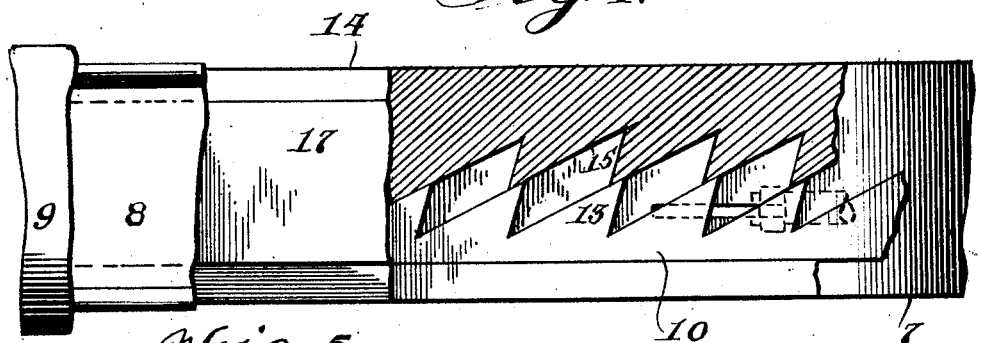
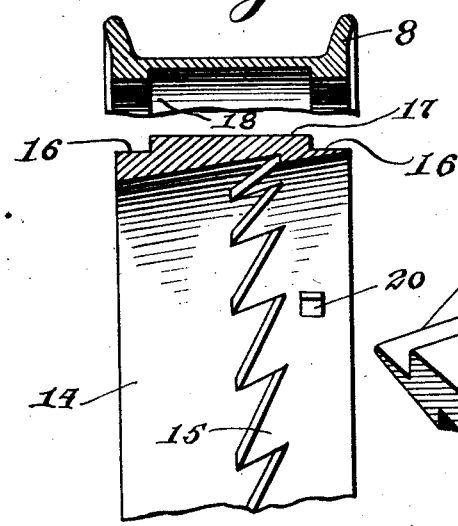
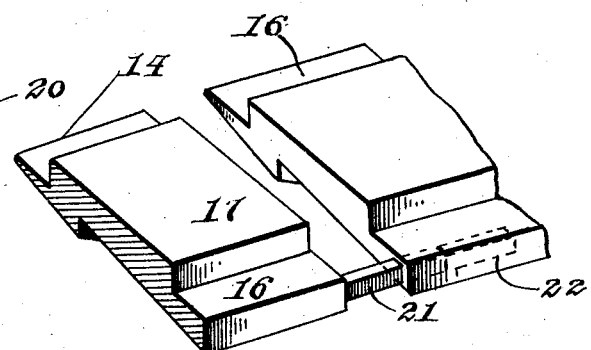
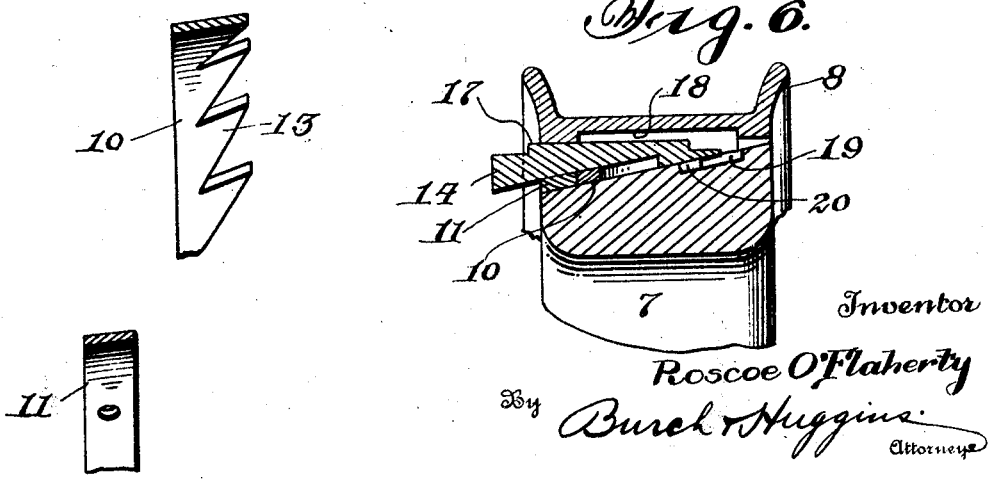
Inventor
Roscoe O'Flaherty
By Burch & Huggins
Attorneys Patented Apr. 14, 1925.

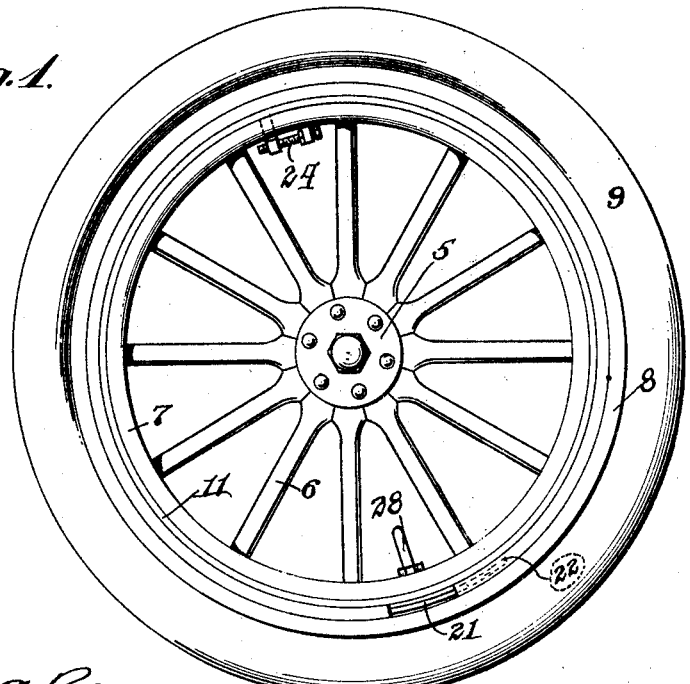
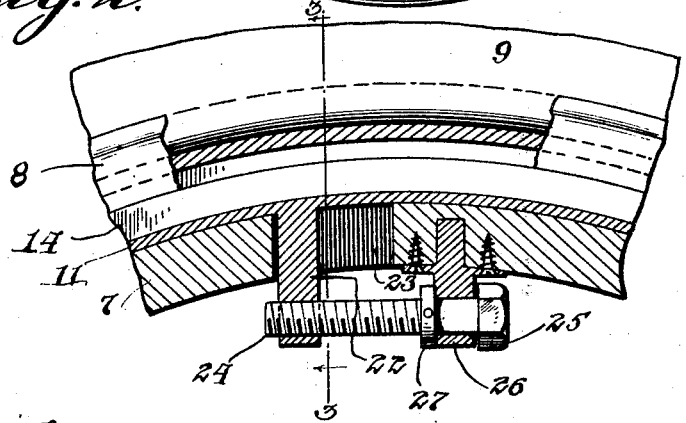
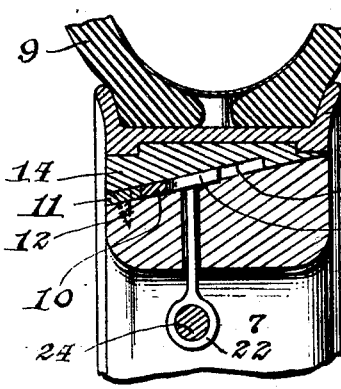

1,533,450

UNITED STATES PATENT OFFICE.

ROSCOE O'FLAHERTY, OF LANHAM, MARYLAND.

VEHICLE WHEEL.

Application filed December 13, 1923. Serial No. 680,388.

*To all whom it may concern:*

Be it known that ROSCOE O'FLAHERTY, who is a citizen of the United States of America, residing at Lanham, in the county of Prince Georges and State of Maryland, has invented certain new and useful Improvements in Vehicle Wheels, of which the following is a specification.

This invention relates to certain new and useful improvements in vehicle wheels, and has particular reference to the provision of improved means for releasably securing or fastening a tire carrying rim upon the felly of the wheel, whereby the use of the objectionable bolts and nuts commonly employed for this purpose, is rendered unnecessary, and whereby removal of the rim and its tire as well as replacement of the same may be accomplished in an expeditious or much quicker manner.

Another object of the invention is to provide rim fastening means of a generally simplified and improved kind, capable of being easily and comparatively inexpensively manufactured as well as requiring no special skill for placing the same in use.

Broadly, the invention consists in providing a felly with a laterally inclined outer surface or periphery which extends or lies at an angle to the axis of the wheel, and a laterally movable securing ring provided with means for causing lateral movement of the same onto the felly, whereby said ring is caused to automatically expand for engagement with the tire rim so as to effectively secure the latter in place.

With the above general objects in view, and others that will become apparent as the nature of the invention is better understood, the same consists in the novel form, combination and arrangement of parts hereinafter more fully described, set forth in the accompanying drawings, and claimed.

In the drawings, wherein like reference characters indicate corresponding parts throughout the several views;

Fig. 1 is a side elevational view of a vehicle wheel having rim fastening means constructed in accordance with the present invention, embodied therein;

Fig. 2 is an enlarged fragmentary view, partly in longitudinal section, and partly in side elevation, showing the rotatable ring and its actuating means;

Fig. 3 is a radial transverse sectional view taken on line 3—3 of Fig. 2;

Fig. 4 is an enlarged fragmentary plan view with the rim broken away and with the securing ring in section so as to reveal the co-operating inclined teeth of the rotatable ring and securing ring by means of which the lateral movement of the latter is effected upon rotation of the former;

Fig. 5 is a developed fragmentary view of the rim, fastening ring, rotatable ring, and the band for securing the latter upon the felly, in transverse section;

Fig. 6 is a view similar to Fig. 3 with the tire removed and with the securing ring in released position;

Fig. 7 is a fragmentary perspective view showing the meeting ends of the split securing ring, and Fig. 8 shows the felly in fragmentary section and the bearing of the adjusting screw in elevation.

Referring more in detail to the several views, the present invention is shown embodied in a vehicle wheel having the usual hub —5— provided with radial spokes —6— which are surrounded by and rigidly connected to a felly —7—, a rim —8— being adapted to be secured upon the felly —7— and to carry a pneumatic or other tire —9—.

The felly —7— is provided with an inclined outer surface, or periphery which extends at an angle to the axis of the wheel, and a rotatable ring —10— is fitted on the periphery of the felly adjacent the margin of the latter where it is of smallest diameter, said ring —10— being held in place, or being secured against lateral displacement from the felly by means of a further ring —11— which is fastened upon the periphery of the felly by means of countersunk screws —12— or the like.

The outer edge of the ring —10— is straight and smooth and rides against a similar edge of the ring —11—, while the inner edge of the ring —10— is formed with a continuous series of ratchet-like teeth —13— whose edges are preferably all inclined in the same general direction.

A securing ring —14— is disposed between the rim —8— and the felly —7— and the same consists of a trans-split ring of metal of such guage and springy nature as to automatically contract, when permitted, to a diameter smaller than that of the interior of the rim —8—, whereby the latter may be removed when the ring —14— is moved laterally from the position shown in Fig. —3— to the position shown in Fig. —6—. The contiguous faces of the felly and the ring —14— are similarly inclined so that the contraction of the ring —14— is permitted when the latter is moved to bring the portion of the inner surface of the ring —14—, which is of greatest diameter, radially opposite the portion of the outer surface of the felly which is of smallest diameter, generally speaking.

In order that the ring —14— may be positively moved onto the felly and expanded into engagement with the rim, said ring —14— has its inner surface rabbeted to accommodate the ring —10— and band —11—, thus producing a shoulder which is formed with ratchet teeth —15— similar to the teeth —13— and formed with their edges inclined in the same direction and interfitting with said teeth —13—. It will thus be seen that when the ring —10— is rotated in one direction, the points of the teeth —13— and —15— will be caused to move toward each other in such manner as to give a cam action for forcing the ring —14— laterally onto the felly. When this takes place expansion of ring —14— is caused. The ring —14— may have its outer surface rabbeted as at —16— along its margins so as to form a rib —17— adapted to snugly fit a groove —18— provided in the inner surface of the rim —8—, so that when the ring —14— is expanded the latter will have positive engagement with the rim for effectively holding the latter in position. Obviously, any desired interdigitating connection may be provided between the rim and the securing ring other than the groove —18— and rib —17—, if found desirable.

The felly may be provided with a transversely elongated groove —19— in its outer surface adapted to receive a small lug —20— projecting inwardly from the ring —14— so as to limit the lateral movement of the latter, while dirt and mud may be excluded from between the ends of the ring —14— to a great extent by providing one end of said ring —14— adjacent its thick edge with a stem —21— slidably engaging in a socket —22— provided in the other end of the securing ring.

A simple and efficient means for rotating the ring —10— may consist in a radial arm —22— which is rigid with the ring —10— and projects inwardly through a suitable elongated slot —23— provided in the felly, said arm —22— having an opening in its inner end whose wall is threaded to engage the screw —24— which is journaled near its head —25— in a bearing —26— suitably fastened to the inner surface of the felly. The head of the screw —24— and a collar —27— fastened on the latter will prevent movement of the screw longitudinally so that its rotation will effect rotation of the ring —10—. The screw —24— may be turned by a suitable tool provided for the purpose, and it is noted that the ends of the ring —14— are sufficiently spaced apart even when the latter is contracted, to provide clearance there between for the usual valve stem —28—.

In operation, assuming that the parts are operatively disposed, as illustrated in Figures —1— and —3—, and that removal of the tire and rim is desired, the screw —24— is rotated in the proper direction so as to move the teeth of the ring —10— away from the teeth of the ring —14—. When this takes place the ring —14—, by reason of its strong tendency to contract, will move laterally and contract until it assumes the position of Figure —6—, wherein the teeth —13— and —15— are interengaged and removal of the rim without considerable effort is permitted. With the parts thus disposed, the rim may be again placed in position and then the screw —24— is rotated in the opposite direction so as to cause the teeth of the rings —10— and —14— to ride along each other until they assume the position of Fig. —4— with the ring —14— shifted laterally onto the felly and expanded into engagement with the rim, as shown in Fig. —3—, rotation of ring —14— being prevented by lug —20—.

From the foregoing description it is believed that the construction and operation, as well as the advantages of the present invention, will be readily understood and appreciated by those skilled in the art.

Minor changes may be made without departing from the spirit and scope of the invention as claimed.

What is claimed as new is:

1. The combination with a felly of a vehicle wheel having its outer surface laterally inclined at an angle to the axis of the wheel, and a trans-split rim securing ring adapted to snugly surround the felly between the latter and the rim and normally tending to contract to a smaller diameter for releasing the rim, of means for causing lateral displacement of the ring relative to the felly for causing expansion of the ring into engagement with the rim, wherein the means for causing lateral displacement of the ring embodies a second ring rotatably mounted between the first named ring and the felly, and wherein said means embodies co-operating teeth with inclined co-operating edges provided upon the said rings.

2. In a vehicle wheel, a felly having an inclined outer surface extending at an angle to the axis of the wheel, a rim securing ring fitted on the surface of the felly, means for preventing rotation of said ring relative to the felly while permitting lateral movement of the same relative to the felly, said ring being of trans-split form and having an inherent tendency to contract, a rim, and means to provide an interdigitating connection between the ring and the rim when the ring is shifted laterally onto the felly for expansion, the parts being constructed to permit sufficient contraction on the ring when the latter is shifted laterally in a direction off of the felly for disengaging the means for providing interdigitating connection between the ring and rim.

3. In a vehicle wheel, a felly having a laterally inclined outer surface, a rim securing ring fitted on the surface of the felly, and having its inner surface rabbeted to provide a shoulder formed with ratchet teeth, said ring being trans-split and formed from springy metal so as to have an inherent tendency to contract, a second ring seated in the rabbet of the first named ring between the latter and the felly and having ratchet teeth formed on one edge co-operating with the teeth of the first named ring, whereby rotation of the second ring will cause lateral displacement of the first ring onto the felly for expanding the same into engagement with a tire carrying rim, and means to rotate said second ring.

In testimony whereof I affix my signature.

ROSCOE O'FLAHERTY.